Inventor:
Konrad Müller.
By [signature] Atty.

Inventor:
Konrad Müller
By [signature] Atty.

Inventor:
Konrad Müller.
By [signature] Att'y.

July 3, 1956

K. MÜLLER 2,753,402

BANK MULTIPLE CONTACT STRUCTURE FOR TELEPHONE SWITCHING MECHANISMS

Filed Feb. 28, 1952

5 Sheets-Sheet 4

Inventor:
Konrad Müller
By [signature] Atty.

July 3, 1956

K. MÜLLER

BANK MULTIPLE CONTACT STRUCTURE FOR TELEPHONE SWITCHING MECHANISMS 2,753,402

Filed Feb. 28, 1952

5 Sheets-Sheet 5

Inventor:
Konrad Müller.
By [signature] Atty.

United States Patent Office 2,753,402

Patented July 3, 1956

2,753,402

BANK MULTIPLE CONTACT STRUCTURE FOR TELEPHONE SWITCHING MECHANISMS

Konrad Müller, Munich-Solln, Germany, assignor to Siemens & Halske Aktiengesellschaft, Munich, Germany, a corporation of Germany Application February 28, 1952, Serial No. 273,847

Claims priority, application Germany October 1, 1948

14 Claims. (Cl. 179—27.5)

This invention relates to a bank multiple contact structure for signal switching devices, especially for automatic telephone switches, and is particularly concerned with a structure comprising a bandlike cable containing conductors, which are bent upon themselves to form at the bending edges bare conductor points constituting the bank contacts for coaction with the switch wipers.

A particular object of the invention is to provide novel mounting or holder means for the bank multiple band cable which comprises relatively short holder sections extending over the spaces coinciding with the associated switches.

The pertinent prior art is briefly reviewed below, to aid in understanding the invention.

The bank multiples form important parts of the swiching equipment and must for trouble-free operation be made with utmost care. The bank multiple structures employed in the various known telephone switching systems differ in accordance with the corresponding structurally different switching mechanisms.

For example, the bank multiple used in a prior system employs contact strips extending in horizontal planes in various vertically successive levels, forming the bank contacts, and provides band cables having a plurality of conductors which are soldered to the bank contacts. This structure requires a great many soldering points, calling for considerable expenditures in material and labor. There is also the possibility of imperfect so-called "cold soldering points" which represent potential sources of trouble. The bank contacts, which are disposed in horizontal planes, may cause trouble due to collecting dust. The wipers are pressed against the bank contacts in axial direction.

A prior machine switching system provides bank multiple contacts disposed in vertically extending planes, thus reducing trouble from collecting of dust. The switch arms or wipers sweep tangentially past the bank contacts and are pressed thereagainst in radial direction. Connection with the bank contacts is, however, again made by means of band cables having conductors which are soldered thereto.

Still another system uses wire- or striplike metallic conductors which are in flat spiral-like fashion carried from switch to switch, the bending portions of the spiral turns forming the bank contacts for coaction with the wipers.

The invention is concerned with a bank multiple contact structure of the last-noted type. Of essential importance in such structure is the mode of mounting the conductor strips.

Figure 1A:
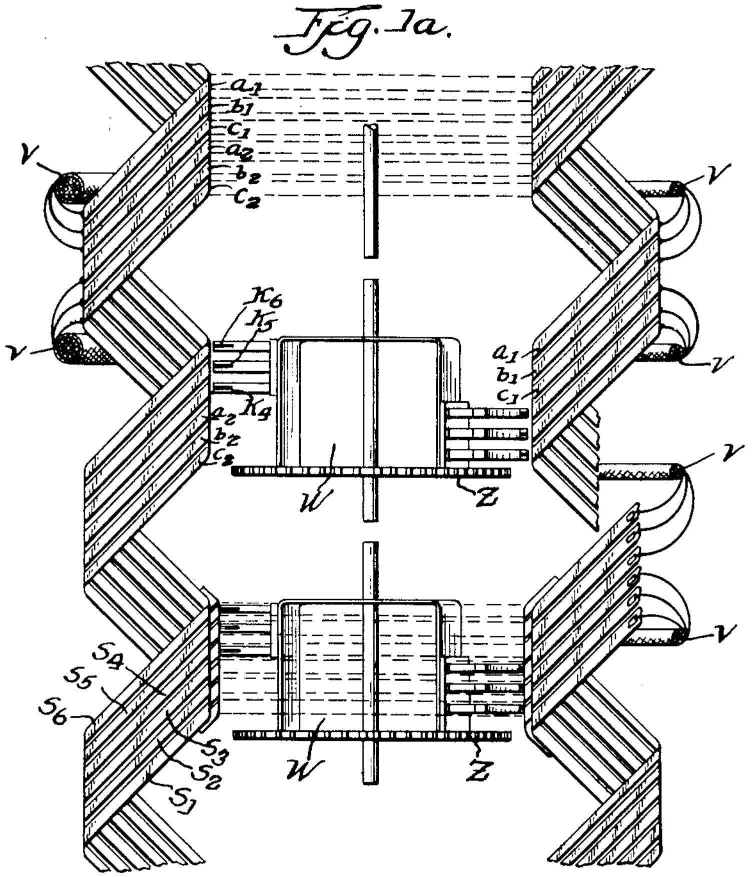
Figures 1B, 2:
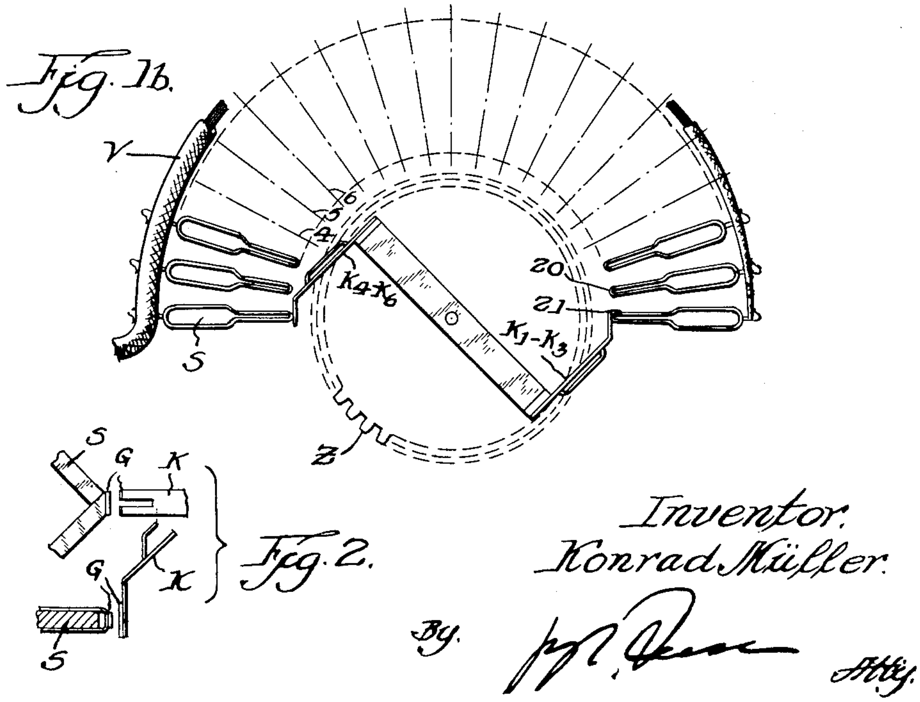
Figure 3A:
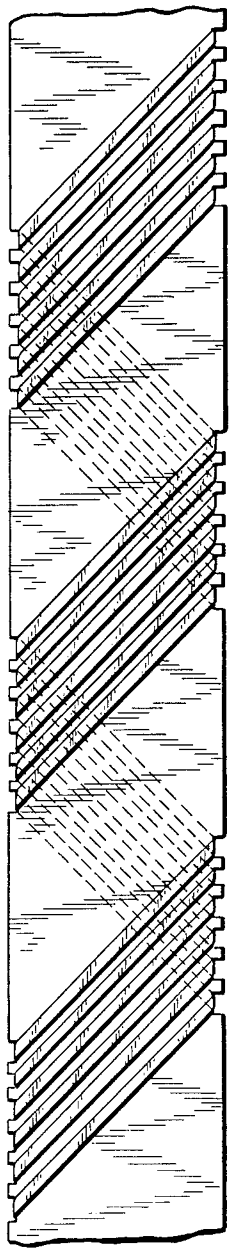
Figure 3B:

The various objects, features and details of the invention will appear from the description which will presently be rendered with reference to the accompanying drawings. In these drawings, Figs. 1*a* and 1 *b* show a simple manner of mounting the conductor strips forming the bank multiple contacts;

Fig. 2 shows the coaction of a wiper with a bank contact;

Figs. 3*a* and 3*b* illustrate a conductor strip on an enlarged scale; and

Figs. 4*a*–11*c* indicate various embodiments of sectional supporting or holder means for the conductor strips which form the bank multiple contacts.

The conductor or contact strips are, in the structure shown in Figs. 1*a* and 1*b*, disposed on carrier strips made of Bakelite or hard paper or the like, which extend from switch to switch over the whole length of a switch frame. The carrier strips are on the longitudinal edges provided with cutouts for securing the position of the conductor strips, the number of cutouts corresponding to the number of conductors. The disadvantage of this structure is that it calls for large amounts of materials, since the width of the insulating strip must correspond to one-half of a switch division. Variations in the tolerances of the spaces between the switches, as well as variations in the switch frames and in the carrier strips, affect the structure detrimentally in view of the great length of the strips, thus giving rise to tensile stresses and causing deformation. Another disadvantage of this structure resides in difficulties to adapt the multiple to varying numbers of switches, because such adaptation requires either insulating pieces of various lengths, entailing great tooling costs, or cutting of the long strips to obtain the required lengths. The cutting of the long bandlike strips containing the conductors, to obtain shorter sections, also introduces the danger of short circuits at the cutting places.

The invention avoids the need for such cutting and attendant danger by mounting or fastening the conductors, which extend over the entire bank multiple field, on a plurality of short insulating holders or carriers which extend only over the spaces corresponding to individual switches.

Another feature of the invention resides in the manner of fastening the conductors on the insulating holders. It has been proposed to fasten the strips carrying the conductors throughout their length from bending edge to bending edge, the conductors being left bare only immediately adjacent the bending edges. Such a structure has the disadvantage that the band- or striplike cable is in longitudinal direction practically rigid and thus unable to compensate for any production tolerances in the longitudinal direction of the conductors. The fastening of the structure on the switch frame is made difficult, and damage may result in the handling or transport of the wired switch assembly and associated frame.

In order to avoid these disadvantages, the invention proposes to fasten the conductors on the insulating holders at one or more points and only over part thereof which extends between the bending edges. The result is that the greater part of the strip is between the bending edges feathered edgewise, thus producing sufficient elasticity in longitudinal direction. An additional advantage is that shocks and vibrations are not transmitted from switch to switch.

Referring now to Figs. 1*a*, 1*b* and 2, there is shown a bank multiple contact field for rotary switches having a vertically extending axis. Only the elements of two switches W are diagrammatically shown, which are required for understanding the structure of the bank multiple. The switches may be of the type as for example disclosed in Patent No. 2,701,824, dated February 8, 1955. Character Z designates a large drive wheel for rotating the carrier on which are mounted the wipers. Each switch comprises two groups of wipers, each group having three wipers $k_1$, $k_2$, $k_3$ and $k_4$, $k_5$, $k_6$, respectively. These wiper groups are displaced by 180° and sweep with respect to the groups of bank multiple contacts $a_1$, $b_1$, $c_1$ and $a_2$, $b_2$, $c_2$, respectively. It is assumed for the sake of simplicity that each row of bank contacts comprises only twenty-one contacts. These contacts are formed by narrow metal strips $s_1$—$s_6$ which are carried in a flat spiral-like fashion from switch to switch. The bending edges of each band form inwardly disposed bare contact points. The wipers sweep relative to these contact points and are pressed radially thereagainst. V designates cables carrying conductors which connect with the conductor strips forming the bank contacts.

Figs. 3*a* and 3*b*, which are believed to be self-explanatory, show part of a conductor strip or band on an enlarged scale.

The bending edges of the conductor strips *s* and the double contacts formed by the switch arms or wipers *k* may, if desired, be coated with precious metal, e. g., silver, as indicated at G in Fig. 2, which may be applied in any desired and suitable manner.

The conductor strips—six in the assumed example—are formed in a band cablelike unit, and these units are disposed in parallel with the switch axis and radially grouped about the switches. The connections with the cables V are made at the outer bending edges of the strips $s_1$—$s_6$.

The bank multiple may be easily cut and separated. All that is necessary is to cut out a portion of the conductor strip at its outer edge. The band cable may also be used for portions of the multiple, e. g., for decades with little traffic, without any structural changes, thus saving material and labor. It may also be installed in the exchange or replaced in case of repair work, as contrasted with other bank multiple structures which do not permit such manipulation at all or only with great difficulties.

Figure 4A:
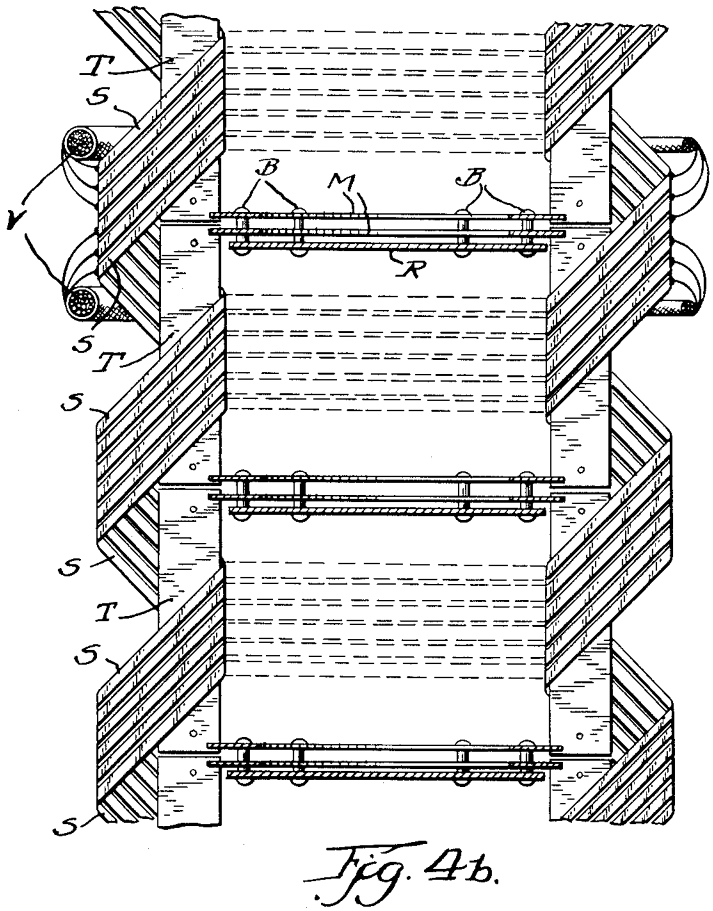
Figure 4B:
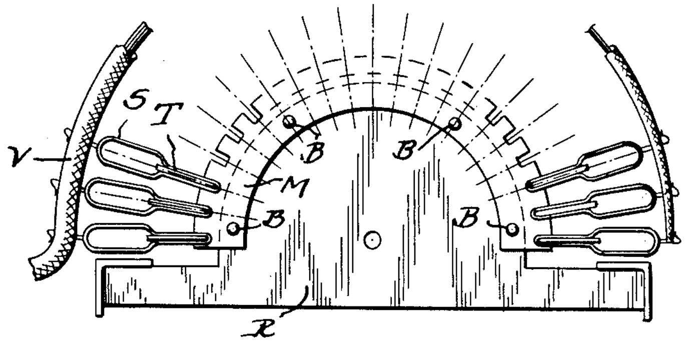

Figs. 4*a* and 4*b* show in diagrammatic manner, in similar representation as Figs. 1*a* and 1*b*, front and transverse elevational views of essential parts of the new bank multiple contact structure. There are provided flat striplike, relatively short holder members T which are made of suitable insulating material. The conductor strips *s* are folded about these holders and are in this embodiment held in their correct positions only along part of their length, and particularly only at the bending or folding edges about the striplike insulating holders T, these bending or folding edges forming the bank contact points. The holders T are secured in slots in segmental plates M which are mounted in their positions on carrier plates R, there being one such carrier plate for each switch. The bores *b* in the carrier plates R are provided for proper centering thereof. The carrier plates are suitably fastened by screws on the angle bars of the switch frame. The freely extending portions of the conductor strips are sufficiently elastic to compensate for variations in the tolerances therein and in the spacing of the carrier plates, and thus permit elastic deformation of the switch frame in handling and transport, without detriment to the bank multiple.

The sectional mounting or holder members may receive different forms, and the conductor strips may be differently fastened thereon.

Figure 5A:
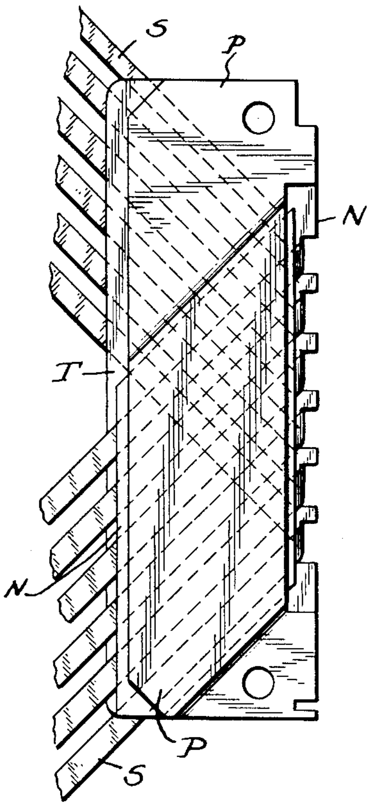
Figure 5B:
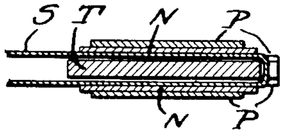

As shown on an enlarged scale in Figs. 5*a* and 5*b*, the conductor strips *s* may be placed about the insulating holder T which may be a punched part and may be provided with serrations along its edge which faces the switch axis, thus forming notches for receiving the conductor strips. A thin insulating member N may be disposed on either side of the strips, and metallic strips P may be disposed outside thereof and suitably secured in place. The conductor strips may be fastened to the holders by ears L, as shown in Fig. 6, which are punched therefrom, or by pointlike depressions formed therein for engagement with recesses or bores formed in the holder members.

Figures 6A, 6B, 8A, 8B, 9A:
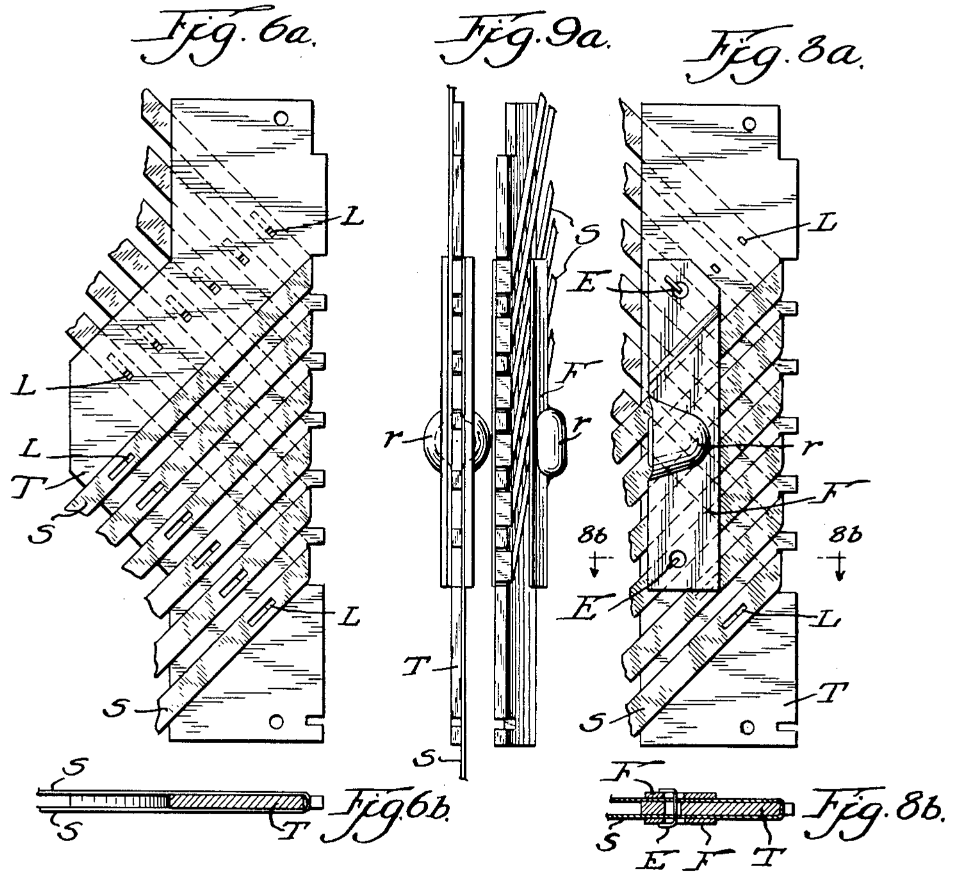

In the embodiment shown in Figs. 6*a* and 6*b*, there is shown a structure from which the securing and stack mounting strips such as N or P of Figs. 5*a* and 5*b* have been omitted. The holder member T is provided with a rearward extension pointing away from the switch axis and forming an enlarged area. Each conductor strip is individually fastened by the ears L punched therefrom. These ears are bent inwardly and inserted into corresponding holes in the holder T. Different fastening means, rivets or the like, may of course be provided.

Figures 7A, 7B, 7C, 9B:
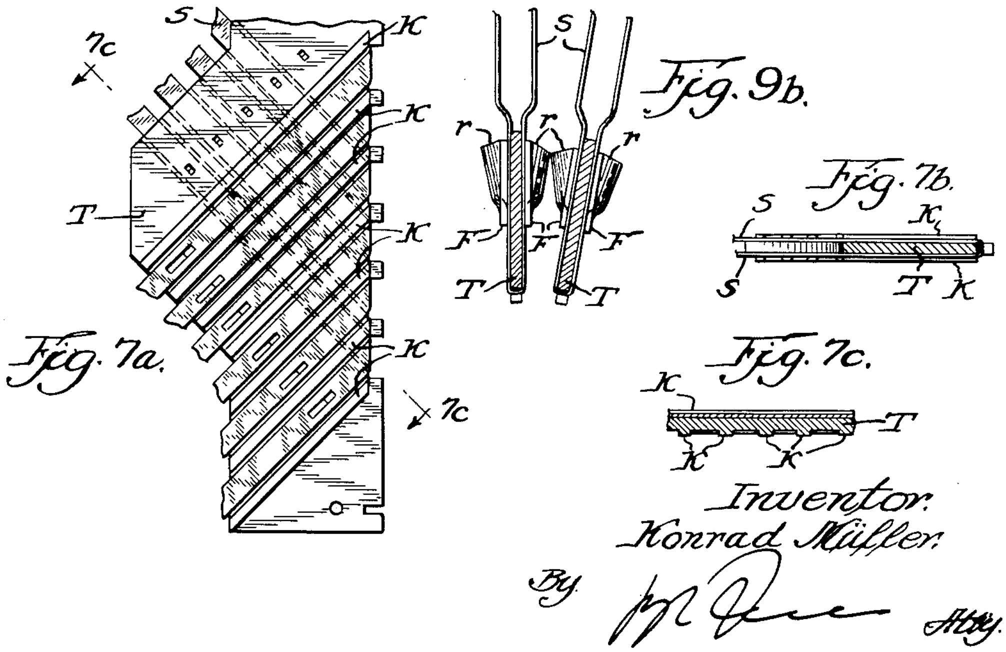

Figs. 7*a* and 7*b* show a similar structure. The holder T consists of a pressed part having integral ribs K pressed thereon, thus forming grooves in which are disposed the conductor strips. The creepage path is thus lengthened and the holder members are tangentially stiffened.

Figs. 8*a* and 8*b* indicate an embodiment in which each conductor strip is for each switch fastened on one side of its holder by an ear L punched therefrom. The group of three conductor strips at the lower end are thus fastened on the front of the holder, and the group of three conductor strips at the upper end are similarly fastened on the other side of the insulating holder. The two outer conductor strips of each group are preferably fastened on the side of the insulating holder on which the bank contacts are formed. Insulating strips F are provided for holding the corresponding conductor strips on the opposite side. These strips F are secured by rivets or by ears E which are carried through holes in the conductor strips and in the holder T. The insulating strips F are provided with embossed resilient sections *r*.

The advantage of the structure shown in Figs. 8*a* and 8*b* over that shown in Figs. 6*a* and 6*b*, 7*a* and 7*b* resides in the use of narrower insulating mounting or holder members, thus saving material.

As is apparent from Figs. 9*a* and 9*b*, the embossed resilient sections *r* of adjacent band cables are in the assembled position thereof in engagement and thus provide a support for the insulating holders in tangential direction. The tolerances in the thickness of the subassemblies are in this manner equalized. The dimensions of the band cable and the spacing between the individual cables can in this manner be kept relatively small, resulting in correspondingly smaller operating strokes for the wipers in executing their individual steps, as well as in favorable and space-saving dimensioning of the entire bank multiple field.

Figure 10B:
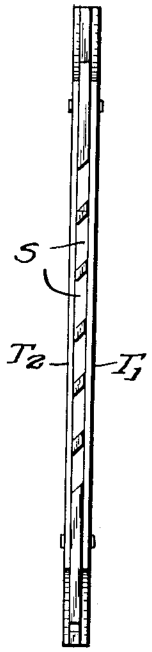
Figure 10A:
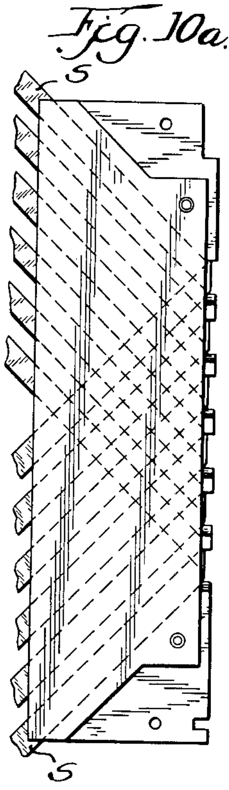
Figure 10C:
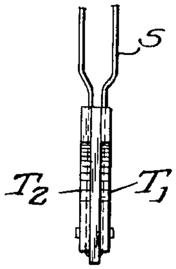

The structure shown in Figs. 10*a*, 10*b* and 10*c* provides a holder which comprises two pressed insulating members T1 and T2. These members embrace the conductor strip adjacent the bending edges which form the bank contacts in the manner of a shell and are held together by suitable means such as screws or rivets. The insulating holder members are provided with extensions, as shown, for mounting coaction with the centering segments.

Figure 11B:
Figure 11A:
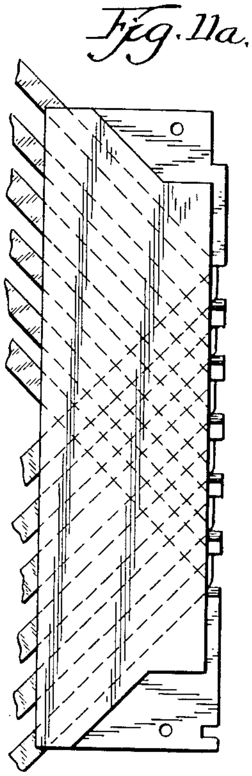
Figure 11C:

The embodiment illustrated in Figs. 11*a*, 11*b* and 11*c* provides a pressed or molded holder containing the strip conductors which are disposed therein by pressing or molding. The holder may be made, e. g., of Bakelite or of a webbing pressed together with Bakelite sheets.

I claim:

1. A bank multiple contact structure for a plurality of coaxially disposed axially successive automatic telephone switches or the like comprising for each switch a plurality of individual elongated platelike insulating members, holder means in each switch for mounting the respectively associated platelike insulating members substantially at their opposite ends to dispose such members along an arc in angularly spaced relationship and with one edge of each insulating member which constitutes the inner edge thereof radially spaced from the respective switch axis, means for adjusting said holder means so as to center the inner edges of said platelike insulating members in each switch relative to the axis thereof, said platelike insulating members being identically disposed in said switches, and flat narrow bandlike conductors wound on correspondingly axially successively disposed platelike insulating members in flat helical convolutions to form on each insulating member inner portions which are bent about the inner edge thereof in intimate engagement with such inner edge to form contacts constituting bank contacts.

2. The structure defined in claim 1, comprising means for fastening portions of each bandlike conductor on the corresponding platelike insulating member therefor.

3. The structure defined in claim 1, comprising means for fastening each bandlike conductor in engagement with the corresponding platelike insulating member therefor near the portion thereof which is bent about the inner edge of such platelike member to form the corresponding bank contact.

4. The structure defined in claim 1, comprising arcuate members for each switch which constitute said holder means for mounting said platelike insulating members, said arcuate members forming slots for receiving the corresponding platelike insulating members at the inner edges thereof.

5. The structure defined in claim 4, comprising mounting members for said arcuate members, and means for joining said arcuate members with said mounting members constituting said adjusting means.

6. The structure defined in claim 1, together with means for securing said flat narrow bandlike conductors on the respectively associated platelike insulating members comprising further insulating members disposed on said conductors, barlike members disposed on each further insulating member, and securing means for holding said barlike members together.

7. The structure defined in claim 1, comprising ears integral with said bandlike conductors for fastening them in engagement with the respective platelike insulating members therefor.

8. The structure defined in claim 1, together with an extension projecting from each platelike insulating member laterally thereof in a direction away from the switch axis, and means integral with each bandlike conductor for fastening it in engagement with said extension.

9. The structure defined in claim 1, comprising stiffening ribs formed on each platelike insulating member, said ribs forming grooves for positioning the associated bandlike conductors wound thereon.

10. The structure defined in claim 1, comprising means integral with said bandlike conductors for fastening such conductors on one side of each associated platelike insulating member, and a strip of insulating material for fastening said bandlike conductors on the other side of said platelike insulating member.

11. The structure defined in claim 10, wherein said last named strip of insulating material forms a resilient portion for supporting engagement with an identical resilient portion formed by the corresponding insulating strip of the conductor assembly on the angularly adjacent platelike insulating member.

12. The structure defined in claim 1, comprising a securing member for said bandlike conductors on each side of said platelike insulating member.

13. The structure defined in claim 1, wherein said bandlike conductors are embedded in the corresponding platelike insulating members.

14. The structure defined in claim 1, wherein said platelike insulating members are molded insulating members, the corresponding conductors being embedded in such molded insulating members.

References Cited in the file of this patent

UNITED STATES PATENTS

| | | |
|---|---|---|
| 1,687,121 | Bohme et al. | Oct. 9, 1928 |
| 1,697,222 | Bohme | Jan. 1, 1929 |
| 2,100,517 | Richardson | Nov. 30, 1937 |
| 2,206,325 | Lomax | July 2, 1940 |
| 2,442,158 | Anderson | May 25, 1948 |
| 2,567,365 | Dalton | Sept. 11, 1951 |